United States Patent [19]

Rhodes

[11] Patent Number: 4,785,377
[45] Date of Patent: Nov. 15, 1988

[54] INSULATED NEUTRAL TIE STRAP
[75] Inventor: John M. Rhodes, Roswell, Ga.
[73] Assignee: Siemens Energy & Automation, Inc., Atlanta, Ga.
[21] Appl. No.: 173,522
[22] Filed: Mar. 25, 1988
[51] Int. Cl.$^4$ .............................................. H02B 1/20
[52] U.S. Cl. ..................................... 361/355; 361/361
[58] Field of Search ................ 307/147; 361/346, 353, 361/355, 356, 358, 361, 363, 426; 439/491, 488

[56] References Cited

U.S. PATENT DOCUMENTS

| 4,167,769 | 9/1979 | Luke et al. | 361/355 |
| 4,536,823 | 8/1985 | Ingram et al. | 361/355 |
| 4,667,269 | 5/1987 | Morby et al. | 361/355 |

OTHER PUBLICATIONS

Siemens Energy & Automation, Inc. article entitled, "I-T-E® EQ® III Load Centers"; Bulletin 3.1.2-1H (1986).

Primary Examiner—A. D. Pellinen
Assistant Examiner—Gregory D. Thompson
Attorney, Agent, or Firm—James G. Morrow

[57] ABSTRACT

An insulating tie strap for supporting conductor bars in a load center including an insulating support member including a center body portion defining a center axis, and two end portions. Each end portion includes a mounting pad having an opening for accepting a fastener, an elevating member for elevating the center body portion above the mounting pad and an angle member for attaching the mounting pad and the elevating member to the center body portion. The openings are offset from the center axis of the center body portion, the mounting pads are attached to the elevated members, and the elevated members are attached to the angle members and the angle members are attached to the center body portion. The mounting pads are each adapted to mount to a conductor bar such as a neutral conductor bar or a ground conductor bar.

6 Claims, 2 Drawing Sheets

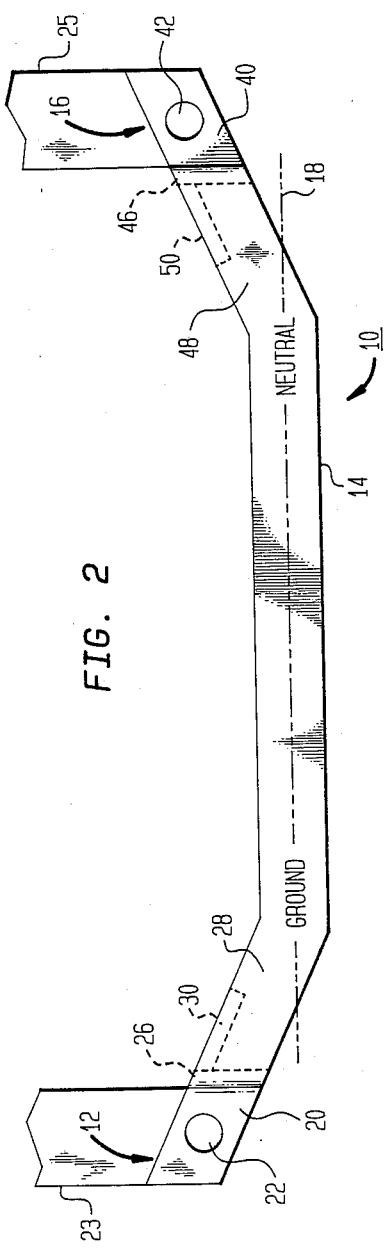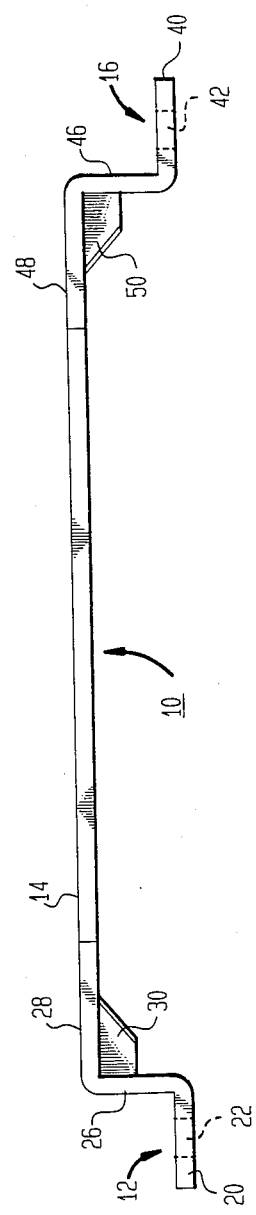

INSULATED NEUTRAL TIE STRAP

BACKGROUND OF THE INVENTION

This invention relates to an insulating tie strap for use in a load center, and, more particularly, this invention relates to a tie strap for identifying and structurally supporting the ground bars and neutral bars in load centers wherein the ground bar must be electrically isolated from the neutral bar in the load center.

In many building complexes, such as multiunit apartments, electrical power is directed into the complex through a main entrance from which the power is distributed to one or more remote load centers. Many, if not all, local electrical codes require that the neutral conductors and ground conductors be electrically connected at the entrance. These codes also require that the neutral conductors and ground conductors be electrically isolated beyond the main entrance at remote load centers.

In FIG. 1 a load center 1 used as a remote load center for housing circuit breakers 7 is illustrated. Both the right and left bars are neutral bars 2 which are electrically isolated from the metal load center enclosure 3. An aluminum tie strap 4 is normally connected between the neutral bars 2 to fix the neutral bars 2 in place and electrically connect the neutral bars. Without the aluminum tie strap 4 the neutral bars 2 are allowed to move relative to the metal load center enclosure 3. In a load center it is important to keep all electrical connections fixed in place securely so that the effects of heating and magnetic fields in the load center do not cause the connnections to move and losen. The losening of a connection will very frequently cause an increase in resistance at the connection and, accordingly, will cause unwanted heating at the connection. In an extreme situation the electrical connection can come apart.

To wire the load center illustrated in FIG. 1 as a remote load center in accordance with most codes, an electrician must obtain at least one separate ground bar 5 which is relatively costly. The ground bar 5 serves as a means for connecting the ground conductors at a remote load center while also ensuring that the ground bar 5 and conductors are electrically isolated from the neutral bars 2 and conductors.

One problem recognized with the above-mentioned wiring configuration is that many electricians do not wire the remote load centers according to this configuration. Many electricians avoid obtaining and using a separate ground bar 5 by removing the aluminum tie strap 4 and using one neutral bar 2 as a ground bar and the other neutral bar 2 as a neutral bar. This configuration provides for a ground bar and neutral bar electrically isolated from each other, but it does not provide means for fixing the ground bar and neutral bar into the load center. Accordingly, this configuration is prohibited by most codes and, if noticed by an electrical inspector, will require modification such that the aluminum tie strap is replaced and a separate ground bar is used. If this prohibited configuration is not noticed, a remote load center will exist wherein the ground and neutral bars are not fixed securely in place. Additionally, the ground and neutral bars will not be identified clearly.

SUMMARY OF THE INVENTION

It is an object of this invention to provide for an apparatus that allows a load center to be wired in accordance with most codes, while also eliminating the need to obtain a separate ground bar.

Another object of the present invention is to provide for an apparatus that distinguishes the neutral bar from the ground bar in a load center when a separate ground bar is not used.

Another object of the present invention is to provide for an apparatus which eliminates the need for obtaining a separated ground bar, while also eliminating the need for modifying the basic configuration of load centers to be used in the future.

Accordingly, there is provided an insulating tie strap for supporting conductor bars in a load center comprising; an insulating support member including a center body portion, defining a center axis; a first end portion; and a second end portion. The first end portion includes a first mounting pad having a first opening for accepting a fastener, a first elevating member for elevating the center body portion above the first mounting pad and a first angle member for attaching the first mounting pad and the first elevating member to the center body portion. The first opening is offset from the center axis of the center body portion, the first mounting pad is attached to the first elevated member, the first elevated member is attached to the first angle member and the first angle member is attached to the center body portion. The second end portion includes a second mounting pad having a second opening for accepting a fastener, a second elevating member for elevating the center body portion above the second mounting pad and a second angle member for attaching the second mounting pad and the second elevating member to the center body portion. The second opening is offset from the center axis of the center body portion, the second mounting pad is attached to the second elevated member, the second elevated member is attached to the second angle member and the second angle member is attached to the center body portion. The first and second mounting pads each are adapted to mount to a conductor bar.

BRIEF DESCRIPTION OF THE DRAWINGS

FIG. 2 is a top view of the tie strap in combination with two conductor bars; and FIG. 3 is a side view of the tie strap.

DESCRIPTION OF THE PREFERRED EMBODIMENT

Figure 1:
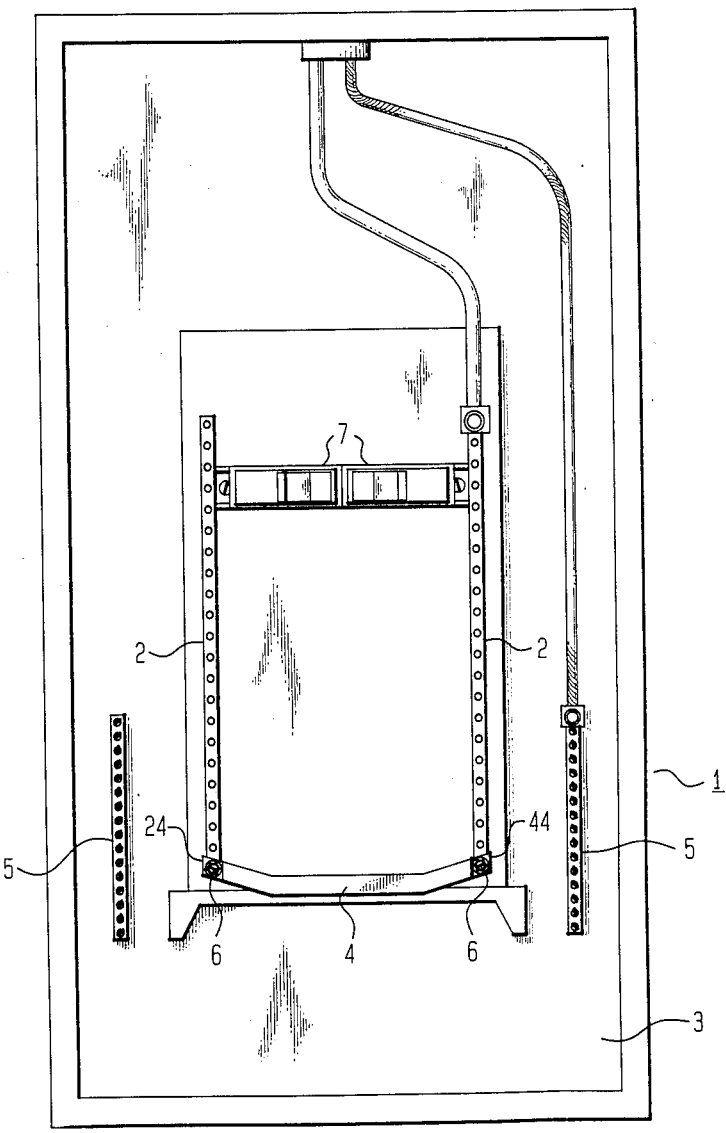
FIG. 1 illustrates the configuration of a commonly used load center.

Turning now to the drawings, FIG. 1 illustrates an I-T-E ® EQ ® III load center. The preferred embodiment of the tie strap 10 is designed to replace the aluminum tie strap 4 illustrated in FIG. 1. Without a tie strap 10, the lower ends will not be properly fastened at their bottom ends 6 and will not be properly identified. Upon replacement of the aluminum tie strap 4, the insulating tie strap 10 provides support for the conductor bars 2 while also electrically isolating the conductor bars 2. This configuration allows one conductor bar 2 to be used as a neutral bar to which neutral conductors can be connected, while the other conductor bar is used as a ground bar to which ground conductors can be connected.

In addition to providing for support, the insulating tie strap 10 serves to identify the conductor bars 2 it supports. The insulating tie strap 10 can be labeled on each end with words indicative of the character of the conductor bars 2 i.e. neutral or ground. In FIG. 2 the ends of the insulating tie strap are labeled with the words "GROUND" and "NEUTRAL", but other means of identifying the ends are also possible. For example, in one embodiment of the invention the ends can be colored or molded from different color plastics. More specifically, the end connected with the ground bar 23 can be green and the end connected with the neutral bar 25 can be white.

FIG. 2 and 3 illustrate the insulating tie strap 10. The insulating tie strap 10 comprises an insulating support member which includes a first end portion 12, a center body portion 14 and a second end portion 16, wherein the center body portion 14 defines a center axis 18.

The first end portion 12 includes a first mounting pad 20 having a first opening 22 for accepting a fastener 24 which fastens a connection bar 23 and the tie strap 10 to a load center. A first elevating member 26 elevates the center body portion 14 above the first mounting pad 20, while a first angle member 28 attaches the first mounting pad 20 and the first elevating member 26 to the center body portion 14. As shown in FIG. 2, the first opening 22 and the first mounting pad 20 are offset from the center axis 18 of the center body portion. Additionally, a first gusset 30 is provided for rigidity and to maintain an angle of substantially 90 degrees between the first angle member 28 and the elevating member 26.

The second end portion 16 includes a second mounting pad 40 having a second opening 42 for accepting a fastener 44 which fastens a connection bar 25 and the tie strap 10 to a load center. A second elevating member 46 elevates the center body portion 14 above the second mounting pad 40, while a second angle member 48 attaches the second mounting pad 40 and the second elevating member 46 to the center body portion 14. As shown in FIG. 1, the second opening 42 and the second mounting pad 40 are offset from the center axis 18 of the center body portion. Additionally, a second gusset 50 is provided for rigidity and to maintain an angle of substantially 90 degrees between the second angle member 46 and the elevating member 48.

The generally horseshoe shaped design of the insulating tie strap 10 provides for extra working room for wiring the load center. By way of example, the insulating tie strap 10 can be fabricated from a plastic such as polypropylene, wherein the strap 10 is formed through an injection molding process to have a substantially rectangular cross-section.

While one embodiment of an insulating tie strap and several modifications thereof have been shown and described in detail herein, various other changes and modification may be made without departing from the scope of the present invention.

I claim:

1. An insulating tie strap for supporting and identifying conductor bars in a load center comprising:
   an insulating support member including a center body portion, a first end portion and a second end portion, the center body portion defining a center axis;
   the first end portion including a first mounting pad having a first opening for accepting a fastener, a first elevating member for elevating the center body portion above the first mounting pad and a first angle member for attaching the first mounting pad and the first elevating member to the center body portion such that the first opening is offset from the center axis of the center body portion, the first mounting pad being attached to the first elevated member, the first elevated member being attached to the first angle member and the first angle member being attached to the center body portion;
   the second end portion including a second mounting pad having a second opening for accepting a fastener, a second elevating member for elevating the center body portion above the second mounting pad and a second angle member for attaching the second mounting pad and the second elevating member to the center body portion such that the second opening is offset from the center axis of the center body portion, the second mounting pad being attached to the second elevated member, the second elevated member being attached to the second angle member and second angle member being attached to the center body portion;
   the first and second mounting pads each being adapted to mount to a conductor bar; and
   means for identifying the conductor bars.

2. The tie strap of claim 1 further comprising a first gusset and a second gusset, the first gusset maintaining an angle of substantially 90 degrees between the first angle member and the first elevating member, the second gusset maintaining an angle of substantially 90 degrees between the second angle member and the second elevating member, the first mounting pad being mounted to a neutral conductor bar and the second mounting pad being mounted to a ground conductor bar.

3. The tie strap of claim 3, wherein the center body portion has a substantially rectangular cross-section.

4. An arrangment for fixing a first conducting bar and a second conductor bar within a load center comprising:
   a first conductor bar;
   a second conductor bar; and
   an insulating support member including a center body portion, a first end portion and a second end portion, the center body portion defining a center axis;
   the first end portion including a first mounting pad having a first opening for accepting a fastener, a first elevating member for elevating the center body portion above the first mounting pad and a first angle member for attaching the first mounting pad and the first elevating member to the center body portion such that the first opening is offset from the center axis of the center body portion, the first mounting pad being attached to the first elevated member, the first elevated member being attached to the first angle member and the first angle member being attached to the center body portion;
   the second end portion including a second mounting pad having a second opening for accepting a fastener, a second elevating member for elevating the center body portion above the second mounting pad and a second angle member for attaching the second mounting pad and the second elevating member to the center body portion such that the second opening is offset from the center axis of the center body portion, the second mounting pad being attached to the second elevated member, the second elevated member being attached to the second angle member and the second angle member being attached to the center body portion;

the first and second mounting pads each being adapted to mount to a conductor bar; and means for identifying the conductor bars.

5. The arrangement of claim 4 further comprising a first gusset and a second gusset, the first gusset maintaining an angle of substantially 90 degrees between the first angle member and the first elevating member, the second gusset maintaining an angle of substantially 90 degrees between the second angle member and the second elevating member, the first mounting pad being adapted to be mounted to the first conductor bar and the second mount pad being adapted to be mounted to the second conductor bar.

6. The arrangement of claim 5 wherein the center body portion has a substantially rectangular cross-section.

* * * * *